United States Patent [19]
Kanwar

[11] 4,280,603
[45] Jul. 28, 1981

[54] BRAKE APPLYING DEVICE
[75] Inventor: Randhir Kanwar, Leamington Spa, England
[73] Assignee: Automotive Products Limited, Warwickshire, England
[21] Appl. No.: 68,537
[22] Filed: Aug. 22, 1979
[30] Foreign Application Priority Data
  Sep. 2, 1978 [GB] United Kingdom ............... 35422/78
[51] Int. Cl.³ .............................................. F16D 65/22
[52] U.S. Cl. ....................................... 188/343; 74/110
[58] Field of Search .................. 74/110; 188/343, 366, 188/368

[56] References Cited
U.S. PATENT DOCUMENTS
| | | | |
|---|---|---|---|
| 3,388,606 | 6/1968 | Hill | 188/343 X |
| 3,511,103 | 5/1970 | Cox | 188/343 X |

FOREIGN PATENT DOCUMENTS
1424536  2/1976  United Kingdom ..................... 188/343

Primary Examiner—Duane A. Reger
Attorney, Agent, or Firm—Kemon & Estabrook

[57] ABSTRACT

A brake applying device for an internal cylinder having pistons operated to apply the brakes by one or both of hydraulic pressure or a wedge assembly that move transversely of the wheel cylinder. The wedge assembly has a wedge and rollers which act between the wedge and the pistons to facilitate movement of the wedge. The rollers are housed in a cage that can move relative to the wedge, the unloaded datum position of the cage on the wedge is determined by two opposed springs that act on the cage.

In order to prevent the cage from becoming damaged during exceptional service conditions it has been arranged for the cage to move relative to the wedge during the initial application of the brakes. This is achieved by providing an abutment which is encountered by the cage during retraction of the wedge so as to compress one of said springs.

3 Claims, 2 Drawing Figures

BRAKE APPLYING DEVICE

This invention relates to brake applying devices for internal shoe drum brakes and which comprise a wheel cylinder having at least one piston which can be urged outwardly to apply the brakes by one or both of hydraulic pressure acting in the cylinder or a wedge assembly which moves transversely of the cylinder, said wedge assembly having a wedge and rollers which act between the wedge and counter surfaces parallel to surfaces on the wedge, the rollers being housed in a cage mounted for relative movement along the wedge and two opposed springs acting against the cage to determine an unloaded datum position of the cage on the wedge.

Such a brake applying device will hereinafter be called a brake applying device of the kind referred.

A brake applying device of the kind referred is used in brake systems where mechanical operation of the brakes, primarily for parking or during emergencies, is effected by a spring acting to urge the wedge member into its operative position. When the mechanical operation of the brakes is not required the spring load is opposed by air pressure acting on a piston, attached to the wedge member, and housed in a chamber not connected with the wheel cylinder. In normal service braking the brakes are applied by hydraulic pressure acting in the wheel cylinder. Such a brake is shown in our British Pat. No. 1,424,536, and it has been found that in exceptional circumstances, in use, that the cage in which the rollers are mounted can become damaged.

Accordingly there is provided a brake applying device of the kind referred, wherein an abutment is provided so that on retraction of the wedge to release the brakes the cage encounters the abutment and is held to compress one of said springs whilst the wedge continues its retraction movement.

An embodiment of the invention will now be described by way of example and with reference to the accompanying drawings in which.

Figure 1:
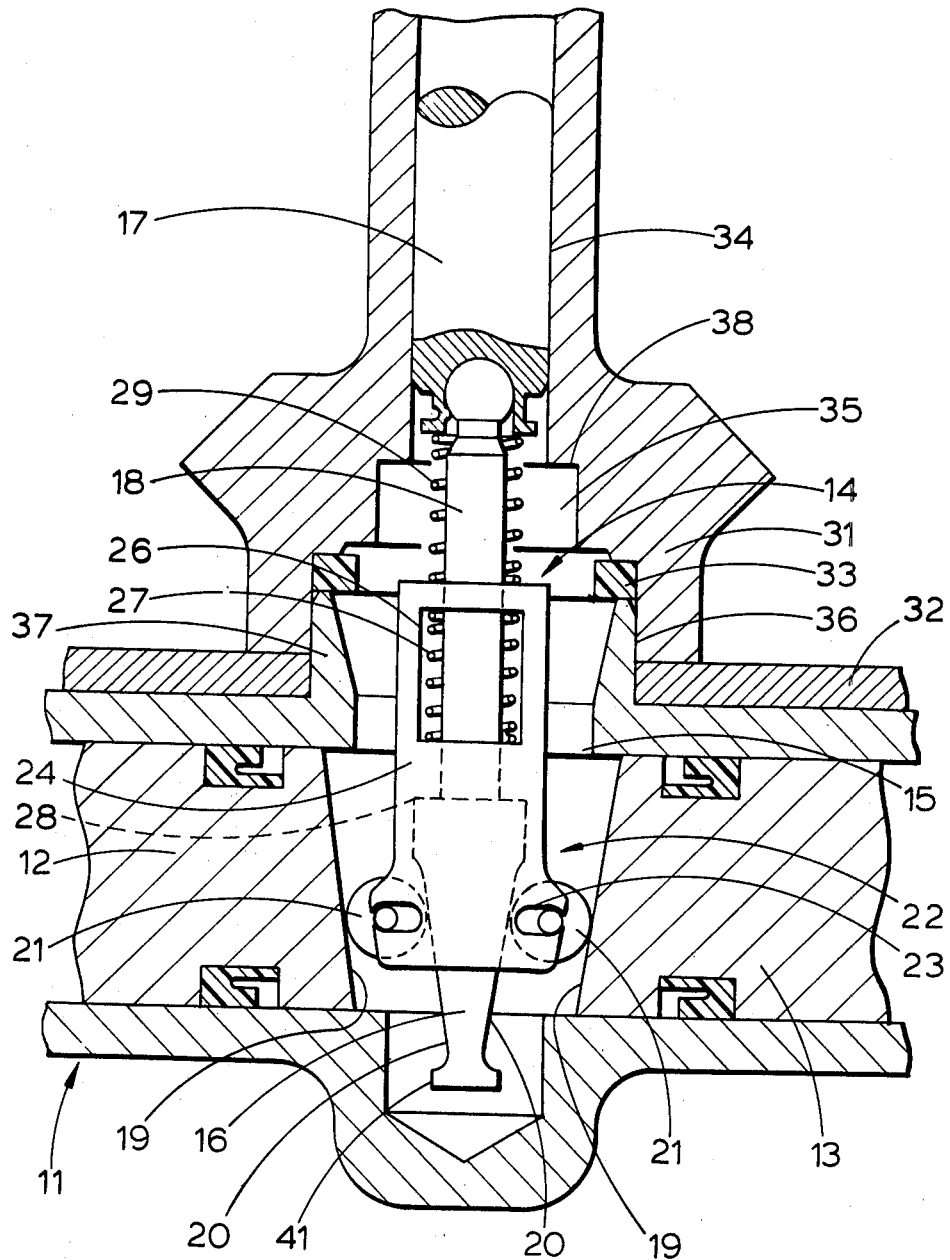
FIG. 1 shows a brake applying device comprising a double ended hydraulic wheel cylinder having a wedge operating between the two pistons and showing the position of the wedge and cage after application of the hydraulic brakes followed by application of the spring applied wedge, when utilised in a leading/trailing brake application.

The workings of the brake applying device will be explained sufficiently for an understanding of the invention. For a more detailed explanation of the functioning of the brake applying device the reader is directed to British Pat. No. 1,424,536.

With reference to the drawings, a double end wheel cylinder 11 has a pair of opposed pistons 12 and 13 therein. The pistons 12 and 13 are arranged between adjacent ends of a pair of brake shoes (not shown).

A wedge assembly 14 is arranged in the hydraulic chamber 15 of the wheel cylinder 11 and has a wedge 16 which is arranged to move diametrally across the bore of the wheel cylinder 11 in the space between the two pistons 12 and 13.

The wedge assembly 14 is connected to a piston 17 which is acted upon by a brake applying spring (not shown) which urges the wedge between the pistons 12 and 13 so as to apply the brakes. The piston 17 also forms part of an air chamber (not shown) such that air pressure in the chamber acts to oppose the load in the brake applying spring.

The wedge 16 tapers such that its thin end is furthest from the piston 17 to which it is connected by a rod 18. The inner ends 19 of the pistons 12 and 13 are oblique so as to lie parallel each to a co-operating one of the wedge faces 20.

Rollers 21 lie between each pair of opposing wedge faces 20 and inner end of a respective piston 12 or 13. The rollers 21 are housed in an inverted 'U' shaped cage 22, the limbs 24 of which lie one on each side of the wedge assembly 14. The base of 'U' has an aperture therein for the passage of the rod 18 such that the cage 22 can move along the wedge assembly. The rollers 21 are located in slots 23, parallel with the wheel cylinder axis, so that the rollers 21 can move axially apart or together as the wedge 16 moves relative to the cage 22.

There are a pair of aligned rectangular windows 26, one in each limb 24 of the cage 22 and a compression spring 27 co-axial with and surrounding the rod 18 is arranged in the windows 26 so that the ends of the spring 27 abut the ends of the windows 26. The back face of the wedge 16 has a shoulder 28 between itself and the rod 18, and as the wedge withdraws from the bore of wheel cylinder 11 the shoulder 28 will move relative to the cage 22 and will abut one end of the spring 27 to gradually compress it against the other end of the window (as in FIG. 2). A second weaker compression spring 29 acts between the piston 17 and the cage 22 to bias the cage 22 towards the thin end of the wedge. With the wedge and cage in the completely unloaded state (not shown), then the datum position of the cage 22 along the wedge is determined by the balance between spring 29 biassing the cage towards the thin end of the wedge, and the spring 27 acting between the shoulder 28 and the cage 22 to bias the cage away from the thin end of the wedge. Since the spring 27 is stronger than the spring 29 when the cage 22 is in its datum position the shoulder 28 will be aligned with that end of the window 26 which abuts the one end of the spring 27.

The wedge assembly 14 and cage 22 are located in the hydraulic chamber 15 formed in the wheel cylinder 11 and within a housing 31 connected to the wheel cylinder. The wheel cylinder 11 and brake applying device grip the back plate 32 of the drum brake therebetween so that the brake applying device is held in position relative to the back plate 32. The housing 31 has a series of stepped bores 34, 35 and 36, therein of decreasing diameters away from the wheel cylinder. The stepped bores are co-axial with the piston 17, which is slidable in the smaller diameter bore 34. The medium and large diameter bores 35 and 36 form part of the hydraulic chamber 15. An extension 37 of the wheel cylinder 11 projects through the back plate 32 into the larger diameter bore 36 of the housing 31 and holds a nylon guide ring 33 in position against the shoulder between the large and medium diameter bores 36 and 35 respectively. The nylon guide ring carries projections (not shown) that prevent the cage 22 and wedge assembly 14 from moving transversely across the chamber 15 i.e. normal to the direction of movement of the wedge.

Figure 2:
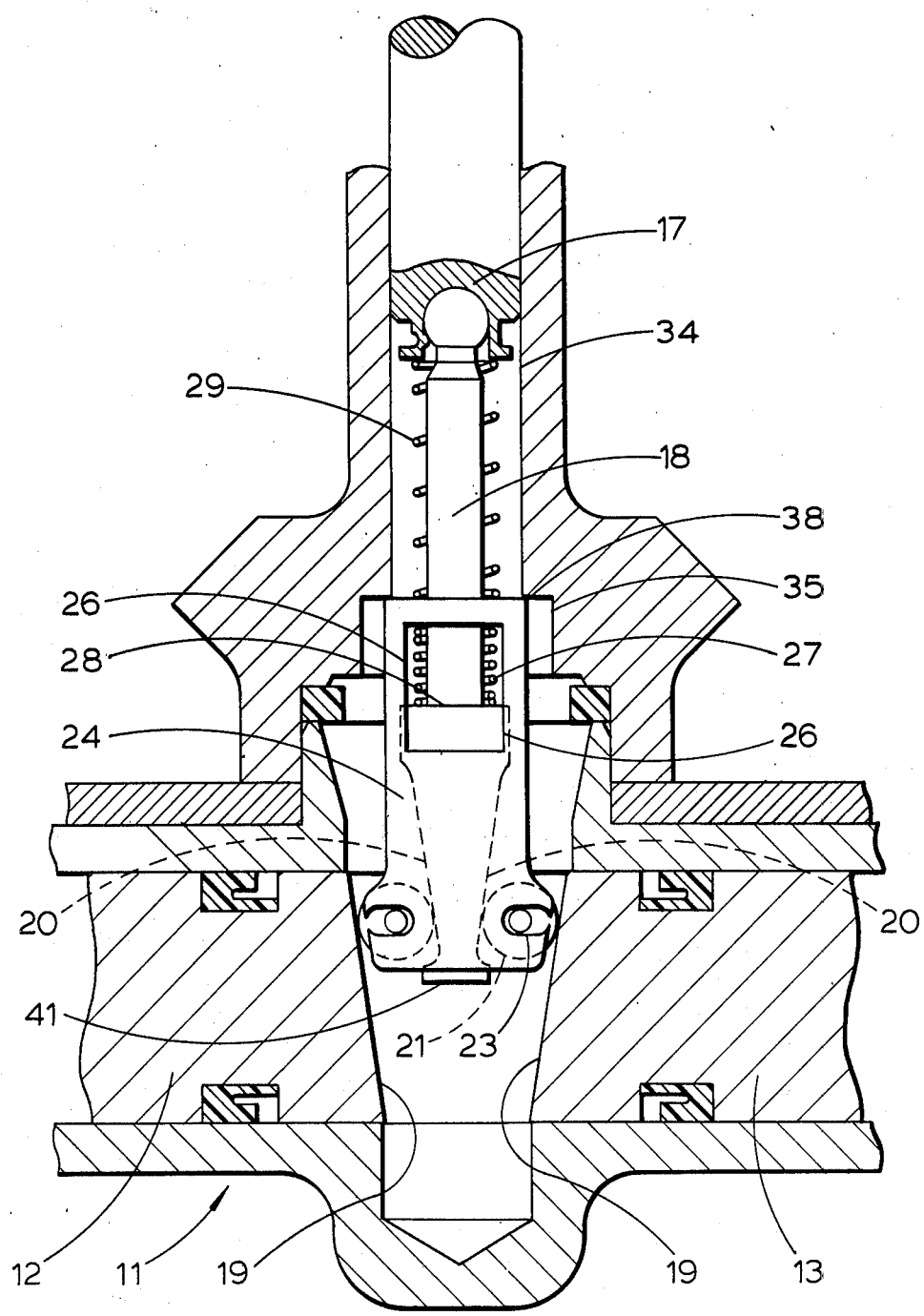
FIG. 2 shows a brake applying device as in FIG. 1 when the wedge is fully retracted.

A shoulder 38 formed between the medium and smaller diameter portions of the bore 35 and 34 respectively, is arranged such that when the wedge is retracted (as is shown in FIG. 2) the shoulder 38 acts as an abutment for the cage 22. Therefore as the wedge is retracted from the wheel cylinder 11 the cage 22 may be moved by the spring 29 relative to the wedge towards the thin end thereof but is at the same time moved with the wedge assembly until it abuts the shoulder 38. Further retraction of the wedge assembly 14 will compress the spring 27 between the end of the window 26 and the shoulder 28 on the wedge 16. Hence when the wedge 16 is fully retracted as in FIG. 2 the spring 27 is compressed and holds the cage 22 against the shoulder 38.

When the brake applying device is operating in a leading/trailing manner and the brakes are first applied hydraulically; the pistons 12 and 13 will be moved outwardly so that the oblique surfaces 19 no longer contact the rollers 21. If the brake applying spring is now bought into action by release of the air pressure holding the piston 17 in the retracted position, then as the wedge assembly 14 moves between the ends 19 of the pistons 12 and 13, the cage 22 will be held against the shoulder 38 until the shoulder 28 on the wedge 16 aligns with the end of the windows 26 so that the spring 27 then acts between the opposed ends of the windows. This ensures that the cage will have moved relative to the wedge 16 away from the thin end thereof.

The wedge 16 and cage 22 will thereafter move together diametrally across the wheel cylinder 11 until the rollers 21 contact the end 19 of the pistons 12 and 13. After further movement of the wedge 16, now moving on the rollers 21 acting between the ends 19 of the pistons and the surfaces 20 on the wedge, the wedge 16 will move in advance of the cage 22 and rollers 21, since the cage 22 will only move half the distance moved by the wedge 16. This movement will continue until the wedge 16 stops against the fully applied pistons 12 and 13.

If the hydraulic pressure is now released the rollers 21 will be forced against the faces 20 of the wedge by contraction of the brake drums and the load in the brake shoe pull off springs (not shown). When the air pressure is restored the cage 22 is held by the rollers 21 and the wedge will withdraw from between the pistons 12 and 13. The load on the faces 20 is relieved by the relative movement of the rollers towards the thin end of the wedge. Therefore, there will be no difficulty experienced as the wedge is withdrawn since the only loads acting on the rollers will be the loads in the brake pull off springs.

The movement of rollers 21 towards the thin end of the wedge 16 is limited by an abutment 41 adjacent the thin end of the wedge. When the rollers 21 have moved down the wedge 16 to contact the abutment 41 further withdrawal of the wedge will cause the rollers 21 to skid over the oblique surfaces 19. This will not damage the surfaces 19 to any great extent since the only loads acting on the rollers will be from the pull off springs (not shown).

While the invention has been described for a double end wheel cylinder, it could be applied to a single ended wheel cylinder with the rollers acting between an end of the piston and an abutment in the wheel cylinder.

I claim:

1. A brake applying device for an internal shoe drum brake and comprising:
    a hydraulic wheel cylinder having a housing with a hydraulic chamber defined therein;
    at least one piston located in the wheel cylinder and which can be urged outwardly of the cylinder by hydraulic pressure so as to apply the brakes;
    a wedge assembly housed in said chamber and which is movable transversely of the cylinder and which is operable against the piston so as to urge the piston outwardly to apply the brakes, said wedge assembly having;
    a wedge;
    rollers which act between the wedge and counter surfaces parallel to surfaces on the wedge, at least one of said counter surfaces being on the piston;
    a cage which houses the rollers and which is mounted for relative movement along the wedge;
    a pair of springs acting in opposition on the cage to determine the unloaded datum position of the cage on the wedge;
    wherein an abutment in the chamber reacts back on the housing so that on retraction of the wedge to release the brakes the cage encounters said abutment and is held thereby in position relative to the housing to compress one of said springs while the wedge continues its retraction.

2. A brake applying device as claimed in claim 1, wherein the abutment is provided by a shoulder on a housing.

3. A brake applying device as claimed in claim 1 or claim 2, wherein the wheel cylinder is a double ended wheel cylinder and the rollers on the wedge act against the counter surfaces provided one on each of the two pistons.

* * * * *